United States Patent [19]

Bateman

[11] 3,717,678
[45] Feb. 20, 1973

[54] BIS(HALOXIMINO)ACETONE AND METHOD OF PREPARATION

[75] Inventor: John H. Bateman, Haverstraw, N.Y.

[73] Assignee: Ciba-Geigy Corporation, Greenburgh, N.Y.

[22] Filed: July 26, 1971

[21] Appl. No.: 166,245

[52] U.S. Cl.......260/566 A, 260/95 R, 260/77.5 AA, 260/307 F, 260/307 H, 260/465 H
[51] Int. Cl..............................................C07c 119/00
[58] Field of Search..................................260/566 A

[56] References Cited

UNITED STATES PATENTS

| | | | |
|---|---|---|---|
| 3,448,199 | 6/1969 | Lamb | 260/566 A X |
| 3,267,078 | 8/1966 | Damusis | 260/77.5 |
| 3,291,775 | 12/1966 | Holm | 260/47 |

*Primary Examiner*—Leon Zitver
*Assistant Examiner*—Gerald A. Schwartz
*Attorney*—Karl F. Jorda et al.

[57] ABSTRACT

Bis(haloximino)acetone derivatives are prepared by a process comprising reacting acetone with an nitrosyl halide in an inert solvent, at a temperature of from −50° to 25°C. A typical embodiment is bis(chloroximino)acetone. These compounds are useful as cross-linking agents, chain-extending and/or capping agents for unsaturated polymers.

5 Claims, No Drawings

BIS(HALOXIMINO)ACETONE AND METHOD OF PREPARATION

BACKGROUND OF THE INVENTION

This invention relates to bis(haloximino)acetone as new compositions of matter, and to a process for the preparation of these compounds.

It is well known in the art that the monochloro nitrosated product of acetone can be prepared by reacting acetone with nitrosyl chloride, as described by H. Rheinboldt and O. Schmitz-Dumont, Ann, 444, 113 (1925), and E. V. Lynn and F.A. Lee, J. Amer. Pharm. Assoc., 16, 309 (1927).

It has now been discovered that by using at least six equivalents of nitrosyl halide in the reaction with acetone and by adding the acetone to the nitrosyl halide solution, as opposed to the reverse addition as was done in the above mentioned references, one obtains the dihalonitrosated products of this invention.

This is particularly surprising in light of the fact that if one attempts to treat the monochloronitrosated product further with nitrosyl chloride, the bis(chloroximino)acetone is not obtained.

DETAILED DESCRIPTION

This invention provides a process for the preparation of bis(haloximino)acetone as new compositions of matter having the formula

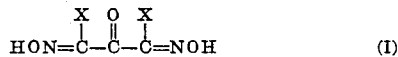

wherein X is a halogen. These novel compounds may be prepared by reacting acetone with at least six equivalents of nitrosyl halide, in an inert solvent at a temperature of from about −50°C to about 50°C, wherein said acetone is added to the nitrosyl halide solution.

The nitrosyl halide used in the preparation of the compound of this invention can be nitrosyl chloride, nitrosyl bromide, or nitrosyl fluoride. The most preferable is the nitrosyl chloride. The nitrosyl halides are commercially available or can be prepared by several different procedures, for example, the nitrosyl halide may be prepared by direct combination of nitric oxide and a halogen, or by the reaction of nitric acid and hydrohalic acids, or by the reaction of metal halides and nitric acid, nitrogen tetroxide or nitrosyl sulfuric acid or from organic and inorganic nitrites. These methods and others are summarized in the review article, L. J. Beckham, W. A. Fessler, and M.A. Kise, Chem. Rev., 48, 319 (1951).

The reaction is carried out at a temperature of from −50°C to about 50°C. For best yields, a temperature range of from −10°C to 25°C is preferred.

As mentioned above, any solvent inert to nitrosyl halide in which the nitrosyl halide possess an appreciable solubility is suitable. It is not necessary that the product be completely soluble in the "solvent" for the reaction to take place. It may sometimes be desirable to use a solvent in which the starting material is completely soluble and the product is completely insoluble.

Examples of suitable solvents are the saturated aliphatic hydrocarbons such as hexane, heptane, cyclohexane, and the like; chlorinated aliphatic hydrocarbons such as carbontetrachloride, methylenechloride, chloroform and the like; aromatic and substituted aratic hydrocarbons such as benzene, toluene xylene and the like; aliphatic esters such as methylacetate, ethylacetate, methylpropionate or the like; and aliphatic ethers such as diethylether, dimethoxydiethylether, and the like. Examples of solvents to be avoided are pyridine, and unsaturated solvents.

Stoichiometrically, the process of this invention can be represented by the following chemical reaction:

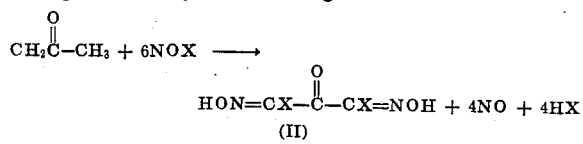

wherein X is as described above.

Thus, it may be seen that for every mole of acetone, 6 moles of nitrosyl chloride are needed. It is generally preferable to have a slight excess of nitrosyl halide to ensure that the product is completely converted to the bis(haloximino)acetone.

Concentration of acetone in the reaction mixture can range from 0.01 to 8 percent by weight of the total reaction mixture and preferably in the range of 0.1 to 5 percent.

In the most preferred embodiment of the process of this invention, a solution of 448 g nitrosyl chloride in 2,000 ml of anhydrous ethylether was cooled to 0°C. To this solution was added 58g of acetone in 200 ml anhydrous ethylether over a 15 minute period. The reaction is kept at about 0°C for 5 hours and then allowed to cool to room temperature and stand for about 12 days. The reaction mixture is filtered and stripped of solvent to afford the product which can be used directly or recrystallized from a suitable solvent.

The bis(haloximino)acetone when used in conjunction with an acid acceptor or alkaline material such as tertiary amines and alkali, or alkaline earth metal hydroxides, are useful as capping, cross-linking and/or chain extending agents for polymers containing unsaturation. These compounds are useful as precursors to nitrile oxides which are very reactive chemical intermediates. The nitrile n-oxides can be reacted with polyfunctional unsaturated compounds to form polymers as described in U.S. Pat. No. 3,493,580.

By taking advantage of the cycloaddition reactivity of these compounds, various bicyclic isoxazole-type derivatives can be easily synthesized in one operation. Thus, compounds of the following type may be synthesized in one step:

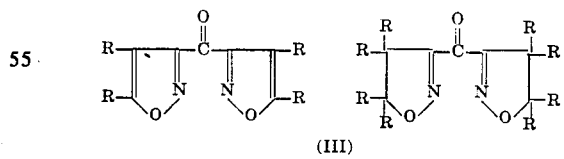

wherein each R is the same or different alkyl or aryl group.

Since there is a difference in reactivity of the two hydroxamoyl halide groups towards base, it is possible under the proper reaction conditions to prepare unsymmetrical derivatives wherein each of the R groups are different. These reactions are general and apply to other multiple bonds systems such as C=N, C=O, C=S, and the like, to form other classes of heterocyclics, as described in Huisgen, Angewandte Chemie International Edition, 2, 565 (1963). These compounds should be useful as medicinals such as bateriocides and as pigments.

To illustrate more specifically the process of this invention, the following examples are presented below.

EXAMPLE 1

Bis(chloroximino)acetone

To a solution of 448 g (6.0 moles) of nitrosyl chloride (99.2 mole percent, Mathesan Co., Inc.) in 2,000 ml of anhydrous ether was added 58 g (1 mole) acetone in 200 ml of ether over a period of 15 minutes. The reaction was kept at 0°C for 5 hours and then allowed to warm to room temperature and stand for 12 days. The ether solvent was removed to yield a white solid which was triturated with 35 ml of water at room temperature and then extracted with ether, dried and stripped of solvent to yield the product which had a melting point of 140°–142°C with gas evolution. Upon recrystallization from chlorobenzene, the product had a melting point of 140–141.5° Analysis Calculated for $C_3H_2Cl_2N_2O_3$.

% Calculated: C, 19.48; H, 1.09; N, 15.14; Cl, 38.33
% Found: C, 19.58; H, 1.12; N, 15.06; Cl, 38.26

A product of substantially the same yield and purity is obtained when one of the solvents, namely, carbon tetrachloride, benzene, ethylacetate or chloroform is substituted for diethylether in the above experiment.

EXAMPLE 2

Bis(bromoximino)acetone

By following the procedure of Example 1, but substituting an equivalent amount of nitrosyl bromide, for the nitrosyl chloride, there is obtained bis-(bromoximino)acetone.

EXAMPLE 3

Bis(chloroximino)acetone as a curing agent for acetylenic polymers

An acetylenically terminated resin was prepared by treating polypropylene oxide triol (hydroxyl No. 35.4) with two equivalents of toluene diisocyanate followed by an equivalent of propargyl alcohol. Analysis of the resin showed 1.44 percent acetylenic unsaturation.

To 10 g of this resin was added 0.506 g of bis(chloroximino)acetone and thoroughly dispersed by mixing. Zinc oxide (1 g) was added, and after thorough mixing, the resulting formulation was placed in a 65 percent relative humidity chamber at room temperature. After 18 hours the mixture had cured to a tough elastomeric material substantially insoluble in benzene.

EXAMPLE 4

Bis(chloroximino)acetone as a room temperature curing agent for olefin-containing polymers A resin was prepared exactly as described in Example 3 except that an equivalent amount of hydroxyethylacrylate was substituted for propargyl alcohol.

To 10 g of the above resin was added 0.5 g of bis(chloroximino)acetone and 0.5 g of calcium oxide. The mixture was thoroughly blended and after three days at 25 percent relative humidity the formulation had cured to a tough elastomeric material substantially insoluble in benzene.

What is claimed is:

1. A compound of the formula

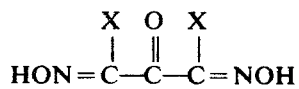

wherein X is a halogen selected from the group consisting of chlorine, bromine and fluorine.

2. The compound of claim 1 which is bis(chloroximino) acetone.

3. A process for preparing the compounds of claim 1 which comprises reacting acetone with at least six equivalents of a nitrosyl halide selected from the group consisting of nitrosyl chloride, nitrosyl bromide and nitrosyl fluoride in an inert solvent at a temperature of from about −50°C to about 50°C, wherein said acetone is added to the nitrosyl halide solution.

4. The process of claim 2 wherein said nitrosyl halide is nitrosyl chloride.

5. The process of claim 3 wherein the process is carried out in diethyl ether at a temperature of from −10° C to about 25°C.

* * * * *